United States Patent
Park

(10) Patent No.: US 10,339,970 B2
(45) Date of Patent: Jul. 2, 2019

(54) VIDEO RECORDING APPARATUS WITH PRE-EVENT CIRCULATION RECORDING FUNCTION

(71) Applicant: IDIS CO., LTD., Daejeon-si (KR)

(72) Inventor: Jin Hui Park, Seongnam-si (KR)

(73) Assignee: IDIS Co., Ltd., Daejeon-si (KR)

( * ) Notice: Subject to any disclaimer, the term of this patent is extended or adjusted under 35 U.S.C. 154(b) by 165 days.

(21) Appl. No.: 15/479,069

(22) Filed: Apr. 4, 2017

(65) Prior Publication Data

US 2017/0309307 A1   Oct. 26, 2017

(30) Foreign Application Priority Data

Apr. 26, 2016   (KR) .................. 10-2016-0050987

(51) Int. Cl.
| | | |
|---|---|---|
| G11B 20/10 | (2006.01) | |
| G11B 27/19 | (2006.01) | |
| H04N 5/781 | (2006.01) | |
| H04N 5/907 | (2006.01) | |
| H04N 5/91 | (2006.01) | |
| G11B 27/32 | (2006.01) | |

(52) U.S. Cl.
CPC ........ *G11B 20/10527* (2013.01); *G11B 27/19* (2013.01); *G11B 27/329* (2013.01); *H04N 5/781* (2013.01); *H04N 5/907* (2013.01); *H04N 5/91* (2013.01); *G11B 2020/10537* (2013.01)

(58) Field of Classification Search
CPC .... G11B 2020/10537; G11B 20/10527; G11B 27/19; G11B 27/329; H04N 5/781; H04N 5/907; H04N 5/91

USPC .................. 386/248, 291, 223; 348/143, 159
See application file for complete search history.

(56) References Cited

U.S. PATENT DOCUMENTS

| | | | |
|---|---|---|---|
| 8,504,772 B2 | 8/2013 | Tan | |
| 9,152,907 B2 | 10/2015 | Tan | |
| 9,684,604 B2 | 6/2017 | Yang | |
| 2004/0240546 A1* | 12/2004 | Wells | H04N 7/181 |
| | | | 375/240.12 |
| 2006/0279628 A1* | 12/2006 | Fleming | G11B 27/034 |
| | | | 348/143 |
| 2007/0260361 A1* | 11/2007 | Etcheson | G07C 5/008 |
| | | | 701/1 |

(Continued)

FOREIGN PATENT DOCUMENTS

| | | |
|---|---|---|
| KR | 10-2010-0109544 A | 10/2010 |
| KR | 10-2014-0039838 A | 4/2014 |

(Continued)

OTHER PUBLICATIONS

Korean Office Action dated Jul. 5, 2017 in counterpart Korean Patent Application No. 10-2016-0050987 (5 pages in Korean).

*Primary Examiner* — Thai Q Tran
*Assistant Examiner* — Stephen R Smith
(74) *Attorney, Agent, or Firm* — NSIP Law

(57) ABSTRACT

A video recording apparatus with a pre-event circulation recording function is provided. A limitation on memory capacity may be removed by recording a pre-event video directly on a nonvolatile storage medium, such as a hard disk drive (HDD), without using a buffer according to a circulation recording method during pre-event recording performed to record videos before and after an event occurs.

13 Claims, 6 Drawing Sheets

(56) References Cited

U.S. PATENT DOCUMENTS

| | | | | |
|---|---|---|---|---|
| 2014/0078344 | A1* | 3/2014 | Yoon | H04N 5/907 348/231.99 |
| 2015/0082328 | A1* | 3/2015 | Bradley | H04N 21/2543 725/2 |
| 2015/0271096 | A1* | 9/2015 | Das | H04L 47/783 709/213 |
| 2015/0312341 | A1* | 10/2015 | Smith | G06F 17/30843 709/213 |
| 2016/0042767 | A1* | 2/2016 | Araya | G11B 19/02 386/201 |
| 2016/0062992 | A1* | 3/2016 | Chen | H04L 9/3242 707/736 |
| 2016/0124667 | A1* | 5/2016 | Lee | H04N 5/77 711/170 |
| 2016/0203844 | A1* | 7/2016 | Fujita | H04N 21/231 386/277 |

FOREIGN PATENT DOCUMENTS

| | | | |
|---|---|---|---|
| KR | 20140039838 | A * | 4/2014 |
| KR | 10-2014-0094953 | A | 7/2014 |
| KR | 10-2014-0147596 | A | 12/2014 |
| KR | 10-2016-0007874 | A | 1/2016 |

\* cited by examiner

VIDEO RECORDING APPARATUS WITH PRE-EVENT CIRCULATION RECORDING FUNCTION

CROSS-REFERENCE TO RELATED APPLICATION(S)

This application claims priority from Korean Patent Application No. 10-2016-0050987, filed on Apr. 26, 2016 in the Korean Intellectual Property Office, the disclosure of which is incorporated herein by reference in its entirety.

BACKGROUND

1. Field

The following description relates to video recording techniques, and more particularly, to a video recording apparatus with a pre-event circulation recording function.

2. Description of Related Art

When event recording is performed to record only a video of a significant event, the efficiency of using a storage space of a video recording apparatus may be increased. However, video data right before an event occurs is important, as well as video data after the event occurs. Thus, a pre-event recording technique of recording videos before and after an event occurs has evolved from an event recording method as disclosed in Korean Laid-open Patent Application No. 10-2014-0094953 (Jul. 31, 2014).

The inventors of the present application have conducted research on a recording technique employing a pre-event circulation recording method which is not limited in terms of memory capacity, in which a pre-event video is recorded directly on a nonvolatile recording medium, such as a hard disk drive (HDD), without using a buffer according to a circulation recording method during pre-event recording performed to record videos before and after an event occurs.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a video recording apparatus with a pre-event circulation recording function, which is not limited in terms of memory capacity since a pre-event video is recorded directly on a nonvolatile storage medium, such as a hard disk drive (HDD), according to a circulation recording method without using a buffer during pre-event recording performed to record videos before and after an event occurs.

In one general aspect, a video recording apparatus with a pre-event circulation recording function includes a video receiver configured to receive a video captured in real time by at least one camera; a nonvolatile storage unit configured to store the video received by the video receiver; and a recording controller configured to control a pre-event video generated before an event occurs to be circulation recorded on a pre-event storage region of the nonvolatile storage unit while complying with a set pre-event storage period, and control a post-event video generated after the event occurs to be recorded on a post-event storage region allocated separately from the pre-event storage region.

In one additional aspect, the recording controller allocates the pre-event storage region and the post-event storage region within a data region of a storage bank having a specific storage space size.

In another additional aspect, a storage bank is allocated for each camera.

In another additional aspect, the recording controller further allocates a spare storage region after the pre-event storage region to comply with the set pre-event storage period when the pre-event storage period is not temporarily complied with due to the circulation recording of the pre-event video.

In another additional aspect, in order to comply with the set pre-event storage period even if initial data of the pre-event storage region is overwritten when the set pre-event storage period is not complied with temporarily by overwriting data when returning to the start of the pre-event storage region after a pre-event video having a length satisfying the set pre-event storage period is recorded, the recording controller records the pre-event video on the spare storage region prior to returning to the start of the pre-event storage region.

In another additional aspect, a storage space size of the pre-event storage region is variable according to quality or resolution of the pre-event video.

In another additional aspect, the quality or resolution of the pre-event video is changed by changing setting of a video quality or resolution of a camera.

In another additional aspect, when an average video size of the pre-event video increases due to a change in quality or resolution of the pre-event video, the recording controller further allocates an additional storage region to increase the storage space size of the pre-event storage region.

In another additional aspect, when the average video size of the pre-event video increases due to a change in the quality or resolution of the pre-event video during the recording of the pre-event video on the pre-event storage region, already recorded data is overwritten, and thus the set pre-event storage period is not complied with, the recording controller stops the recording of the pre-event video on the pre-event storage region and records the pre-event video on the additional storage region.

In another additional aspect, when an average video size of the pre-event video decreases due to a change in quality or resolution of the pre-event video, the recording controller decreases the storage space size of the pre-event storage region to correspond to the decreased average video size.

In another additional aspect, the recording controller stores index information and retrieval characteristic information in an index region of the storage bank, wherein the index information identifies locations of the pre-event video recorded on the pre-event storage region and the post-event video recorded on the post-event storage region, and the retrieval characteristic information identifies a retrieval characteristic of each index.

In another additional aspect, the recording controller further records reading order information of the pre-event video, which is circulation recorded on the pre-event storage region, in the index region of the storage bank.

In another additional aspect, the video recording apparatus further includes a video retrieval unit configured to determine a storage characteristic of a video recorded on a storage location corresponding to an index included in the index information on the basis of the retrieval characteristic information stored in the index region of the storage bank, and reads the video from the storage location corresponding to the index according to the determined storage characteristic.

In another additional aspect, the storage characteristic determined by the video retrieval unit includes one of a general characteristic indicating that the video is sequentially stored; a circulation characteristic indicating that the video is circulation recorded; and a blank-space characteristic indicating a blank space.

In another additional aspect, when the determined storage characteristic is the circulation characteristic, the video retrieval unit reads the pre-event video by referring to the reading order information stored in the index region of the storage bank.

Other features and aspects will be apparent from the following detailed description, the drawings, and the claims.

Figure 1:
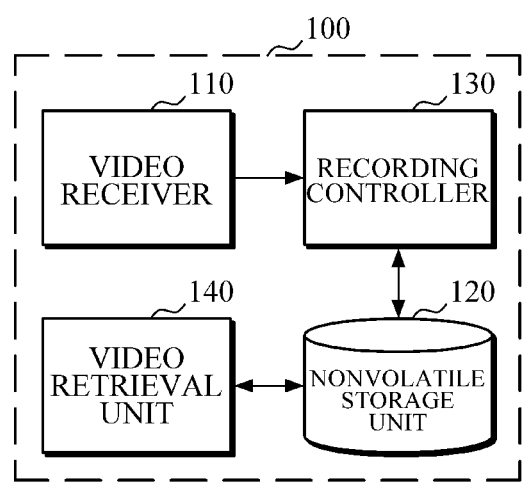
FIG. 1 is a block diagram illustrating an example of a video recording apparatus with a pre-event circulation recording function according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, exemplary embodiments will be described in detail with reference to the accompanying drawings so that one of ordinary skill in this art can easily understand and implement the present disclosure.

In the following description, well-known functions or constructions are not described in detail if it is determined that they would obscure the embodiments due to unnecessary detail. The terms used in the following description are defined in consideration of functions of embodiments set forth herein and may be thus modified according to the intentions of users or operators, precedents, or the like. Thus, the terms used herein should be defined based on the whole context of the following description.

FIG. 1 is a block diagram of a video recording apparatus 100 with a pre-event circulation recording function according to an embodiment. As illustrated in FIG. 1, the video recording apparatus 100 with the pre-event circulation recording function according to the present embodiment includes a video receiver 110, a nonvolatile storage unit 120, and a recording controller 130.

The video receiver 110 receives a video captured in real time by at least one camera (not shown). For example, the video receiver 110 may be configured to receive a video captured by at least one IP camera installed in a surveillance zone via a wired or wireless Internet network.

The nonvolatile storage unit 120 stores a video received by the video receiver 110. For example, the nonvolatile storage unit 120 may be a hard disk drive (HDD) which is a storage medium configured to read or store data by rotating a magnetic disk, or a solid-state drive (SSD) which is an ultra-high-speed semiconductor memory operating at higher speed, having a lower mechanical delay or a lower failure rate, and generating less heat or noise, than the HDD.

The recording controller 130 controls a pre-event video generated before an event occurs to be circulation recorded on a pre-event storage region of the nonvolatile storage unit 120 while complying with a set pre-event storage period, and controls a post-event video generated after the event occurs to be recorded on a post-event storage region allocated separately from the pre-event storage region.

For example, if the pre-event storage period is set to store a 10-minute pre-event video, the recording controller 130 circulation-records the pre-event video by sequentially recording the pre-event video on a pre-event storage region corresponding to ten minutes starting from the start of the pre-event storage region, returning to the start of the pre-event storage region at the end of the pre-event storage region, and overwriting data on the recorded pre-event video.

When an event occurs during the circulation recording of the pre-event video, the recording controller 130 records a post-event video generated after the event occurs on the post-event storage region allocated separately from the pre-event storage region. For example, the event may occur when a specific motion or gesture is recognized in the pre-event video.

Accordingly, according to an embodiment, memory capacity is not limited since a pre-event video which is longer than a post-event video generated after the event occurs may be recorded directly on a nonvolatile storage medium, such as a HDD, without using a buffer according to a circulation recording method during pre-event recording performed to record videos generated before and after an event occurs, thereby increasing the efficiency of using a storage space of a video recording apparatus.

Figure 2:
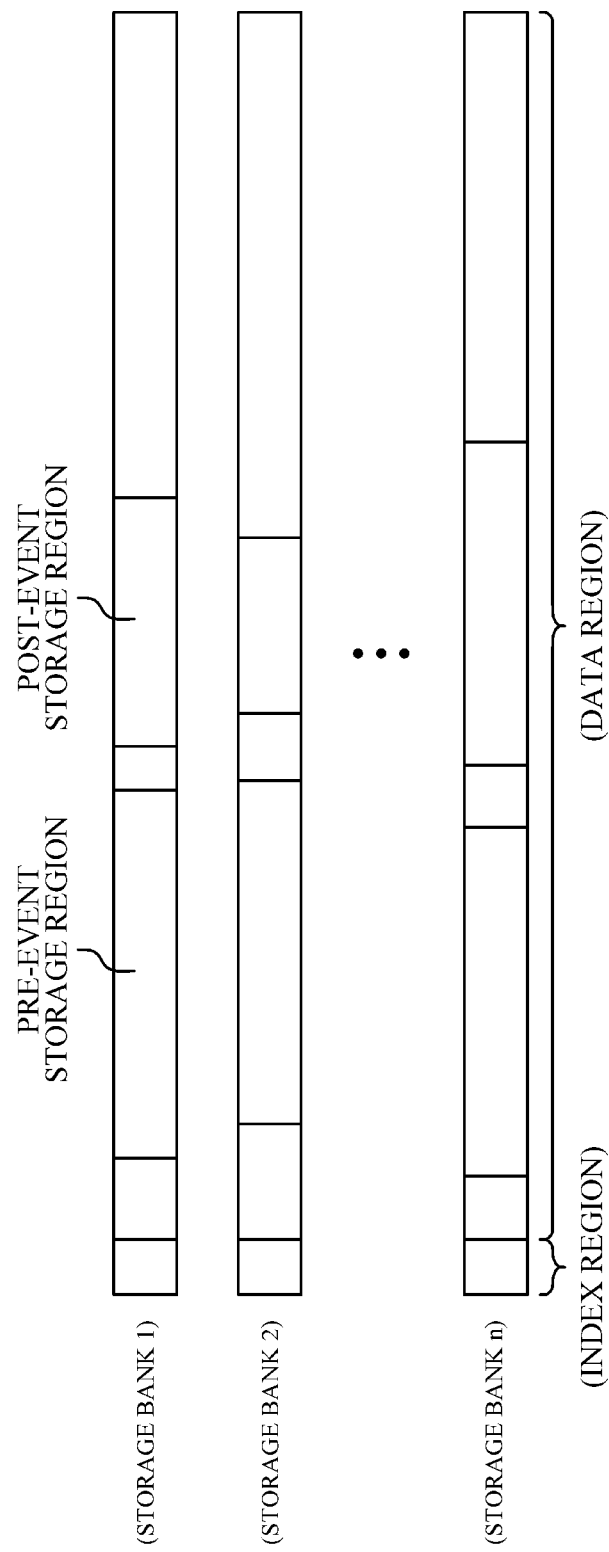
FIG. 2 is a diagram illustrating an example in which a pre-event storage region and a post-event storage region are allocated by a video recording apparatus with a pre-event circulation recording function.

According to an additional aspect, the recording controller 130 may be embodied to allocate a pre-event storage region and a post-event storage region within a data region of a storage bank having a specific storage space size as illustrated in FIG. 2. In this case, a storage bank may be allocated for each camera, and may be set when a HDD or a SSD used as the nonvolatile storage unit 120 is formatted.

Each storage bank is divided into an index region and a data region. To facilitate retrieving of a pre-event video or a post-event video recorded on the data region, fixed-size index information is recorded on the index region, and a pre-event video of a specific time period or a post-event video of a specific event time, which has a variable size, is recorded on the data region according to the quality or resolution of the pre-event video or the post-event video.

Each of the index information items in the index region corresponds to data regarding a pre-event video or a post-event video recorded on the data region. A starting position of the pre-event video or the post-event video recorded on the data region is recorded as index information so that the pre-event video or the post-event video may be read from the starting position thereof in the data region when needed.

Figure 3:
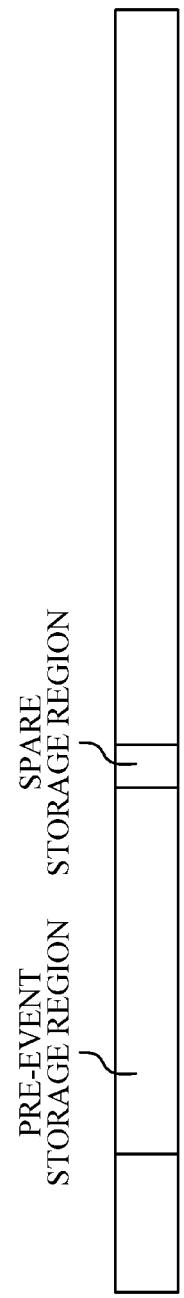
FIG. 3 is a diagram illustrating an example in which a spare storage region is allocated by a video recording apparatus with a pre-event circulation recording function.

According to an additional aspect, as illustrated in FIG. 3, when the set pre-event storage period is not temporarily complied with due to circulation recording, the recording controller 130 may further allocate a spare storage region after the pre-event storage region to comply with the set pre-event storage period. For example, the recording controller 130 may further allocate a spare storage region of a time period corresponding to an interval of a group of pictures (GOP), i.e., an interval of an I-frame, after the pre-event storage region.

In this case, in order to comply with the set pre-event storage period even if initial data of the pre-event storage region is overwritten when the set pre-event storage period is not complied with temporarily by overwriting data when returning to the start of the pre-event storage region after a pre-event video having a length satisfying the set pre-event storage period is recorded, the recording controller 130 may be configured to record the pre-event video on the spare storage region prior to returning to the start of the pre-event storage region.

When the recording controller 130 sequentially records the pre-event video on a pre-event storage region allocated to correspond to a specific time period, starting from the start of this region, returns to the start of the pre-event storage region at the end of the pre-event storage region, and overwrites data on the recorded pre-event video, a total identifiable length of the pre-event video recorded on the entire pre-event storage region may be temporarily less than the specific time period.

This is because the pre-event video may be coded and identified in units of GOP including a repeated form of an I-frame and a plurality of P-frames which can be retrieved. Thus, when data is overwritten on the recorded pre-event video by returning to the start of the pre-event storage region at the end of the pre-event storage region, the I-frame of the recorded pre-event video may be lost and thus a total identifiable length of the pre-event video recorded on the entire pre-event storage region may be temporarily less than the specific time period.

To solve this problem, the recording controller 130 may further allocate a spare storage region after the pre-event storage region in units of a specific storage time period, e.g., at an interval of the GOP, so that the pre-event video may be recorded on the spare storage region without returning to the start of the pre-event storage region after the pre-event video is recorded on the end of the pre-event storage region and then data may be overwritten on the pre-event video by returning to the start of the pre-event storage region. Thus, it is possible to prevent a total identifiable length of the pre-event video recorded on the entire pre-event storage region from being temporarily less than the specific storage time period.

The size of a storage space of the pre-event storage region may vary as the quality or resolution of the pre-event video changes. For example, the quality or resolution of the pre-event video may be changed as setting of a video quality or resolution of a camera is changed.

Figure 4:
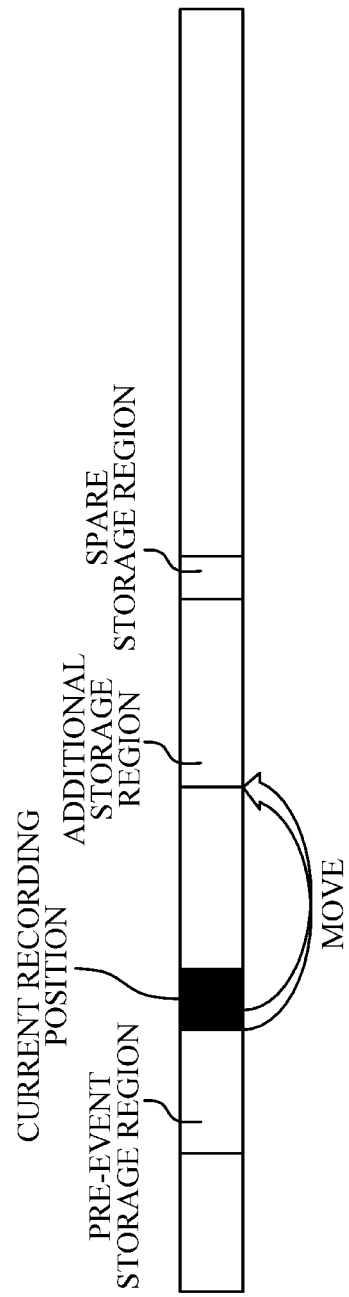
FIG. 4 is a diagram illustrating an example in which an additional storage region is further allocated by a video recording apparatus with a pre-event circulation recording function when an average size of a pre-event video is increased.

According to an additional aspect, when an average video size of a pre-event video increases due to a change in the quality or resolution of the pre-event video, the recording controller 130 may further allocate an additional storage region to increase the size of the storage space of the pre-event storage region as illustrated in FIG. 4.

In this case, when recording the pre-event video on the pre-event storage region, the average video size of the pre-event video increases due to a change in the quality or resolution thereof and thus recorded data is overwritten, which prevents the set pre-event storage period from being complied with, the recording controller 130 stops the recording of the pre-event video on the pre-event storage region and records the pre-event video on the additional storage region.

Figure 5:
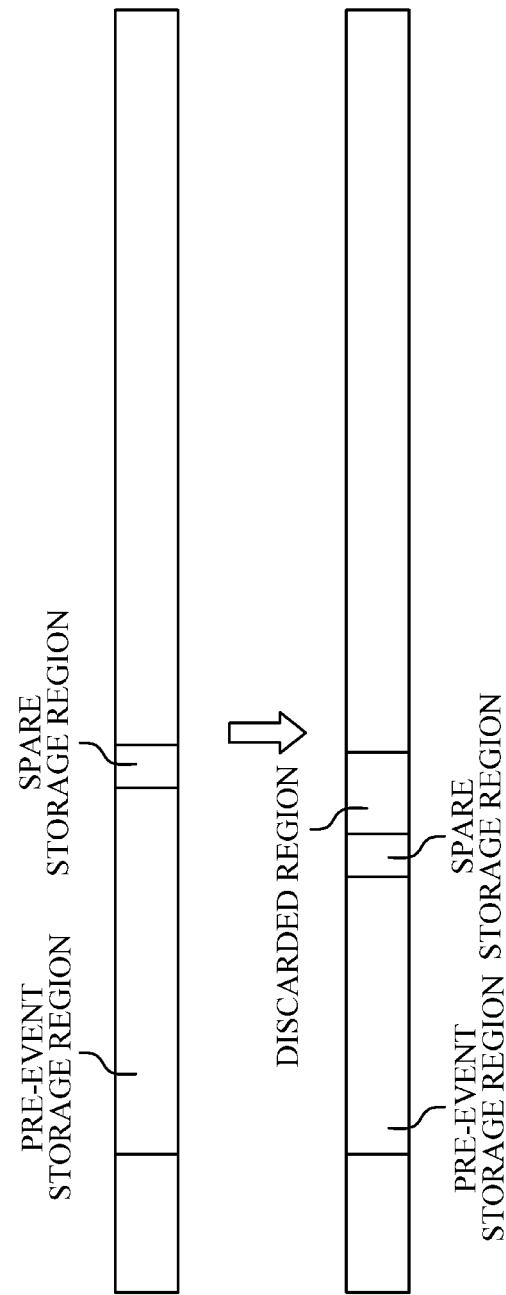
FIG. 5 is a diagram illustrating an example in which a storage space size of a pre-event storage region is decreased by a video recording apparatus with a pre-event circulation recording function when an average size of pre-event video is reduced.

In contrast, when the average video size of the pre-event video deceases due to a change in the quality or resolution thereof, the recording controller 130 may decrease the size of the storage space of the pre-event storage region corresponding to the decreased average video size as illustrated in FIG. 5.

When pre-event videos of the same time period are different from each other in terms of video quality or resolution, average video sizes of the pre-event videos are different from each other. In the present embodiment, the pre-event storage region may be controlled to be variable by increasing or decreasing the size of the storage space thereof according to the quality or resolution of a pre-event video.

Figure 6:
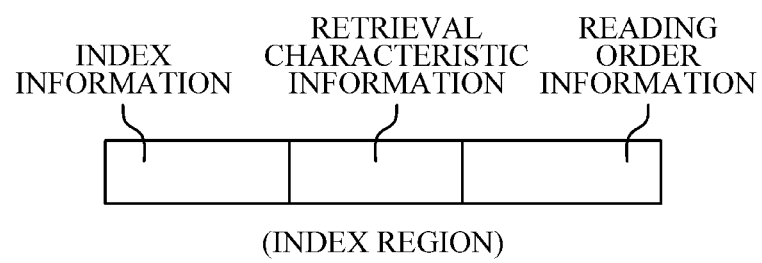
FIG. 6 is a diagram illustrating an example of an index region of a storage bank employed by a video recording apparatus with a pre-event circulation recording function.

According to an additional aspect, as illustrated in FIG. 6, the recording controller 130 may be configured to record, on an index region of a storage bank, index information identifying locations of a pre-event video recorded on the pre-event storage region and a post-event video recorded on the post-event storage region and retrieval characteristic information identifying a retrieval characteristic of each index.

Furthermore, as illustrated in FIG. 6, the recording controller 130 may be configured to further record reading order information of a pre-event video, which is circulation recorded on the pre-event storage region, on the index region of the storage bank.

In this case, the retrieval characteristic of each of the indexes may be a general characteristic indicating that the pre-event video or the post-event video has been sequentially recorded, a circulation characteristic indicating the pre-event video has been circulation recorded, or a blank-space characteristic indicating a blank space.

When a pre-event video or a post-event video is retrieved, the location of a pre-event video recorded on a pre-event storage region or a post-event video recorded on a post-event storage region may be identified according to the index information.

When a pre-event video or a post-event video is retrieved, a method of reading a pre-event video recorded on a pre-event storage region or a post-event video recorded on a post-event storage region may be determined according to the retrieval characteristic information.

If a retrieval characteristic included in the retrieval characteristic information is the general characteristic, the pre-event video or the post-event video is sequentially read from the pre-event storage region or the post-event storage region.

If the retrieval characteristic included in the retrieval characteristic information is the circulation characteristic, the pre-event video is read from the pre-event storage region in an order of reading the pre-event video, which is included in the reading order information.

If the retrieval characteristic included in the retrieval characteristic information is the blank-space characteristic, the pre-event video or the post-event video is not read from the pre-event storage region or the post-event storage region.

Alternatively, the retrieval characteristic information and the reading order information may be stored in a data region other than the index region of the storage bank or may be stored in an additionally allocated region other than the index region or the data region.

According to an additional aspect, the video recording apparatus 100 with the pre-event circulation recording function may further include a video retrieval unit 140. The video retrieval unit 140 determines a storage characteristic of a video recorded on a location corresponding to an index included in the index information on the basis of the retrieval characteristic information recorded on the index region of the storage bank, and reads the video from the location corresponding to the index according to the determined storage characteristic.

For example, the storage characteristic determined by the video retrieval unit 140 may be a general characteristic indicating that the video has been sequentially recorded, a circulation characteristic indicating that the video has been circulation recorded, or a blank-space characteristic indicating a blank space.

If the determined storage characteristic of the video is the circulation characteristic, the video retrieval unit 140 reads a pre-event video from the pre-event storage region by referring to the reading order information recorded on the index region of the storage bank.

If the determined storage characteristic of the video is the general characteristic, the video retrieval unit 140 sequentially reads a pre-event video or a post-event video from the pre-event storage region or the post-event storage region.

If the retrieval characteristic of the retrieval characteristic information is the blank-space characteristic, the video retrieval unit 140 does not read a pre-event video or a post-event video from the pre-event storage region or the post-event storage region.

According to one aspect, the recording controller 130 may be configured to record a pre-event video or a post-event video on the pre-event storage region or the post-event storage region in a disk input/output (I/O) unit, such as a disk sector size, which is smaller than a write cache unit, thereby preventing waste of a storage space.

As described above, according to the above embodiments, a pre-event video is recorded on a nonvolatile storage medium, such as a HDD, without using a buffer according to the circulation recording method during pre-event recording performed to record videos before and after an event occurs. Accordingly, memory capacity is not limited and thus the efficiency of using a storage space of a video recording apparatus may be increased.

The current embodiments can be implemented as computer readable codes in a computer readable recording medium. Codes and code segments constituting the computer program can be easily inferred by a skilled computer programmer in the art. The computer readable recording medium includes all types of recording media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable recording medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A video recording apparatus with a pre-event circulation recording function, the video recording apparatus comprising:
   a video receiver configured to receive a video captured in real time by at least one camera;
   a nonvolatile storage unit configured to store the received video; and
   a recording controller configured to control a pre-event video generated before an event occurs to be circulation recorded on a pre-event storage region of the nonvolatile storage unit while complying with a pre-event storage period, and control a post-event video generated after the event occurs to be recorded on a post-event storage region allocated separately from the pre-event storage region,
   wherein, when the pre-event storage period is temporarily not complied with due to the circulation recording of the pre-event video, the recording controller allocates a spare storage region after the pre-event storage region for complying with the pre-event storage period, and
   wherein, when returning to a start of the pre-event storage region after recording the pre-event video which has a length satisfying the pre-event storage period, the recording controller records the pre-event video on the spare storage region prior to returning to the start of the pre-event storage region in order to comply with the pre-event storage period irrespective of initial data of the pre-event storage region being overwritten when returning to the start of the pre-event storage region.

2. The video recording apparatus of claim 1, wherein the recording controller allocates the pre-event storage region and the post-event storage region within a data region of a storage bank having a specific storage space size.

3. The video recording apparatus of claim 2, wherein the storage bank is allocated for each camera.

4. The video recording apparatus of claim 2, wherein
   the recording controller stores index information and retrieval characteristic information in an index region of the storage bank,
   the index information identifies locations of the pre-event video recorded on the pre-event storage region and the post-event video recorded on the post-event storage region, and
   the retrieval characteristic information identifies a retrieval characteristic of each index.

5. The video recording apparatus of claim 4, wherein the recording controller further records reading order information of the pre-event video, which is circulation recorded on the pre-event storage region, in the index region of the storage bank.

6. The video recording apparatus of claim 5, further comprising a video retrieval unit configured to determine a storage characteristic of a video recorded on a storage location corresponding to an index included in the index information based on the retrieval characteristic information which is stored in the index region of the storage bank, and read the video from the storage location corresponding to the index according to the determined storage characteristic.

7. The video recording apparatus of claim 6, wherein the storage characteristic determined by the video retrieval unit comprises any one of a general characteristic indicating that the video is sequentially stored, a circulation characteristic indicating that the video is circulation recorded, and a blank-space characteristic indicating a blank space.

8. The video recording apparatus of claim 7, wherein, when the determined storage characteristic is the circulation characteristic, the video retrieval unit reads the pre-event video by referring to the reading order information, which is stored in the index region of the storage bank.

9. The video recording apparatus of claim 1, wherein a storage space size of the pre-event storage region is variable according to quality or resolution of the pre-event video.

10. The video recording apparatus of claim 9, wherein the quality or resolution of the pre-event video is changed as setting of a video quality or resolution of a camera is changed.

11. The video recording apparatus of claim 9, wherein, when an average video size of the pre-event video increasing due to a change in quality or resolution of the pre-event video, the recording controller further allocates an additional storage region to increase the storage space size of the pre-event storage region.

12. The video recording apparatus of claim 11, wherein, when the average video size of the pre-event video increases due to a change in the quality or resolution of the pre-event video during recording of the pre-event video on the pre-event storage region so that already recorded data is overwritten and the pre-event storage period is not complied with, the recording controller stops the recording of the pre-event video on the pre-event storage region and records the pre-event video on the additional storage region.

13. The video recording apparatus of claim 9, wherein, when an average video size of the pre-event video decreases due to a change in quality of resolution of the pre-event video, the recording controller decreases the storage space size of the pre-event storage region to correspond to the decreased average video size.

* * * * *